United States Patent
Sacks et al.

(10) Patent No.: US 7,171,363 B2
(45) Date of Patent: Jan. 30, 2007

(54) PICK-BY-LINE SYSTEM AND METHOD

(75) Inventors: Jerry Dennis Sacks, Houston, TX (US); James Michael Parks, Richmond, TX (US); Donald Paul Pry, Sugar Land, TX (US)

(73) Assignee: System Application Engineering, Inc., Houston, TX (US)

( * ) Notice: Subject to any disclaimer, the term of this patent is extended or adjusted under 35 U.S.C. 154(b) by 552 days.

(21) Appl. No.: 10/736,107

(22) Filed: Dec. 15, 2003

(65) Prior Publication Data

US 2004/0128133 A1 Jul. 1, 2004

Related U.S. Application Data

(60) Provisional application No. 60/435,993, filed on Dec. 23, 2002.

(51) Int. Cl.
*G08B 13/14* (2006.01)
*G10L 15/00* (2006.01)

(52) U.S. Cl. .................. 704/270; 704/260; 705/23; 705/29

(58) Field of Classification Search ............... 704/270, 704/260; 705/23, 29
See application file for complete search history.

(56) References Cited

U.S. PATENT DOCUMENTS

| | | | | |
|---|---|---|---|---|
| 6,496,806 | B1 * | 12/2002 | Horwitz et al. | ............... 705/28 |
| 6,600,418 | B2 * | 7/2003 | Francis et al. | ........... 340/572.1 |
| 2003/0020629 | A1 | 1/2003 | Swartz | ................. 340/825.25 |

* cited by examiner

*Primary Examiner*—Daniel Abebe
(74) *Attorney, Agent, or Firm*—Wendy K. Buskop; Buskop Law Group, PC

(57) ABSTRACT

The invention is a method for picking an object from a source transport device vehicle using a mobile computer with text-to-speech software adapted for communication between a pick-by-line server and a user wherein the method entails transmitting a request from the server to the mobile computer to identify at least one source transport device from which an object is to be picked by a step, generating a summary of the objects to be picked, providing the summary using via the text-to-speech software, acknowledging receipt of the summary, identifying an object to determine if the object is to be picked, advising the user with the text-to-speech software if the object is correct, acknowledging the object has been picked, repeating these steps until all objects have been picked, providing an acknowledgement to the pick-by-line server of the results of the picking, and transferring the results from the server to the at least one external computer system.

9 Claims, 13 Drawing Sheets

PICK-BY-LINE SYSTEM AND METHOD

CROSS-REFERENCE TO RELATED APPLICATIONS

This application claims priority from co-pending U.S. patent application Ser. No. 60/435,993, filed Dec. 23, 2003, which is incorporated herein by reference.

FIELD OF THE INVENTION

The present invention relates to a method and system for picking an object at a location from a source transport device and placing the object on a specified receiving transport device.

BACKGROUND OF THE INVENTION

Current methods for picking objects from a source transport device and pricing those objects onto the correct receiving transport device are slow and subject to error. The costly mistakes are not picking the correct object or quantities of objects and the placing of the object onto the wrong receiving transport device.

A need has existed to overcome the above problems, efficiently and economically.

SUMMARY OF THE INVENTION

The invention relates to a method for object selection from a source transport device for movement to a receiving transport device. The method uses a mobile computer having a bar code reader, a display, an audio output device, an audio input device, a tactile input device, text to speech software, voice recognition software, object selection applications software, and a radio frequency identification (RFID) reader. The mobile computer is adapted for communication between an order systems server and a user, such as a warehouse person. The order systems server is adapted for communication between the mobile computer and at least one external computer system.

The first step of the method involves the user entering a user code and possibly a security password to log onto the mobile computer. Next, in some cases if the mobile computer is not trained to the voice of the user and the user has an unusual accent or way that some words are pronounced, it may be useful to train the computer using the voice recognition software. As a second step, the mobile computer provides instructions to the user from the object selection applications software using the text to speech software to the audio output device. The information includes information from the object selection applications software to the display, Next, a request is made to from the mobile computer to the order systems server to obtain a list of objects to be selected from the source transport device. Using the applications software, a summary of the objects to be selected is created. The summary is displayed on the display and the summary is provided using via the text to speech software to the audio output device.

The user can then acknowledge the summary using the tactile input device (the keyboard) or by acknowledging the summary by speaking into the audio input device.

The mobile computer then can instruct the user to go to a location, herein also referred to as a lane, using the text-to-speech software. The user can then acknowledge that the user is at the location using the voice recognition software. With the mobile computer, the user can:
  i. say the check digits for the receiving transport location into the audio input device;
  ii. scan the bar code of the receiving transport using the bar code reader;
  iii. reading the receiving transport with the RFID reader;
  iv. using voice recognition software to verifying the check digits for the receiving transport device;

Next, the text to speech software can be used to indicate the quantity of the objects needed via the audio output device to the user and the user can acknowledge the indicated quantity of the objects. The user can acknowledge the object to be selected from the source transport device to be moved to the receiving transport device by inputting a member of the group:
  i. the identification characters for an object by the user using voice recognition software;
  ii. the bar code of a case of objects by the user using the bar code reader;
  iii. the bar code of an individual object by the user using the bar code reader;
  iv. the case of objects with the RFID reader; and
  v. the individual object with the RFID reader.

The steps above can be repeated all objects on the list have been selected. Next an acknowledgement can be made to the order systems server the results of the process steps and results from the order systems server can be transferred to the at least one external computer system.

BRIEF DESCRIPTION OF THE DRAWINGS

The present invention will be explained in greater detail with reference to the appended figures, in which.

The present invention is detailed below with reference to the at least one source transport device.

DETAILED DESCRIPTION OF THE PREFERRED EMBODIMENTS

Before explaining the present invention in detail, it is to be understood that the invention is not limited to the particular embodiments and that it can be practiced or carried out in various ways.

In the preferred embodiment, the invention relates to a method for picking objects from a source transport device (8) and placing them on the required receiving transport device.

Figure 1:
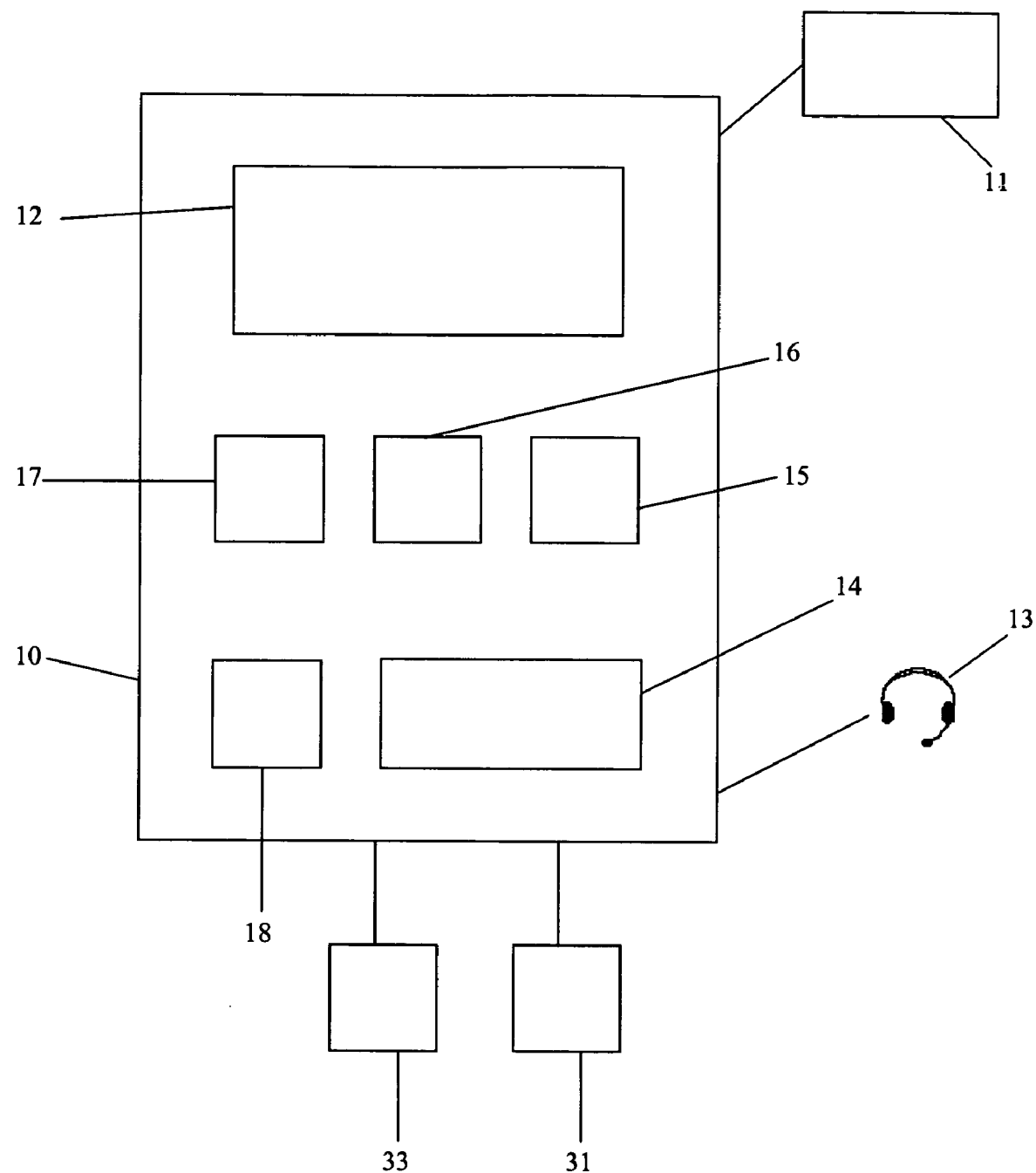
FIG. 1 is a diagram of an overview of the system for use by the method of the invention.

FIG. 1 shows the method uses a mobile computer (10). The mobile computer has a bar code reader (11), a display (12), an audio output device (13), an audio input device (31), a tactile input device (14), text-to-speech software (15), voice recognition software (16), pick-by-line applications software (17), and radio frequency identification (RFID) reader (18). The objects to be loaded can also be a transport device containing product, product, or a piece of equipment.

The mobile computer is a model number PDT8146-D4BA30WW or PDT8146-T4AB30WW or similar device available from Symbol Technologies, Inc. The bar code scanner can be a scanner that is part of the mobile computer or a wireless scanner like the CRS-1-20000-00 Wireless Bluetooth Ring Scanner available from Symbol Technologies. The audio input device, or headset, is a Knowles Acoustics Headset, Single Ear (Part No. VR3344) or Knowles Acoustics (Model TC-6300-314-1121-00). The voice recognition software can be Speech2Go Software or Vocom 3200 both available from ScanSoft, Inc. or Mobile Conversay MCSDK from Conversational Computer Corporation. The text-to-speech software may be ScanSoft Inc.'s RealSpeak Solo Software. The wireless communication radio for the mobile computer is a Bluetooth Connection Kit consisting of the CompactFlash I/O Bluetooth Card, Type I provided by Socket Communications. The communications network which would enable the mobile computer to communicate to the host server in a wireless mode would be the Spectrum24 Wireless Network from Symbol Technologies. A typical printer usable in this invention would be a QL320 or QL420 Wireless Bluetooth Printer from Zebra Technologies. These models and manufacturers, as well as products similar in nature, can be used in the preferred embodiment of the invention.

A holster for the printer is Systems Application Engineering's Soft Pack Printer Holster or SAENT-03. The holsters for the mobile computer are provided by Symbol Technologies, Part Number 11-53814-01.

Figure 2:
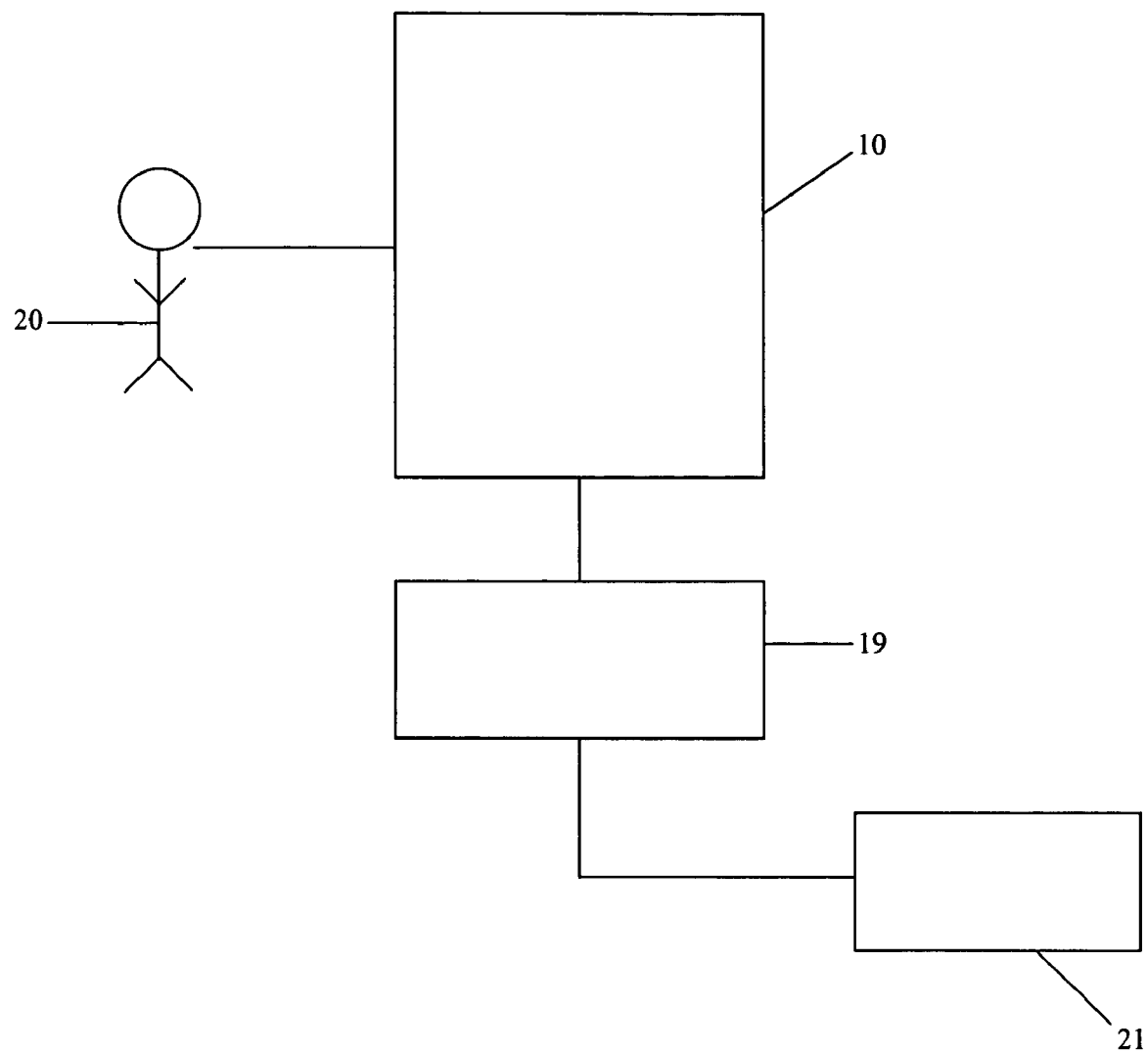
FIG. 2 is a diagram of the mobile computer and accessories used in the inventive method and the software stored thereon.

The mobile computer is adapted to facilitate communication between the pick-by-line server (19) and a user (20). The pick-by-line server aids in transferring data between the mobile computer and at least one external computer system (21) as shown in FIG. 2.

Figure 3:
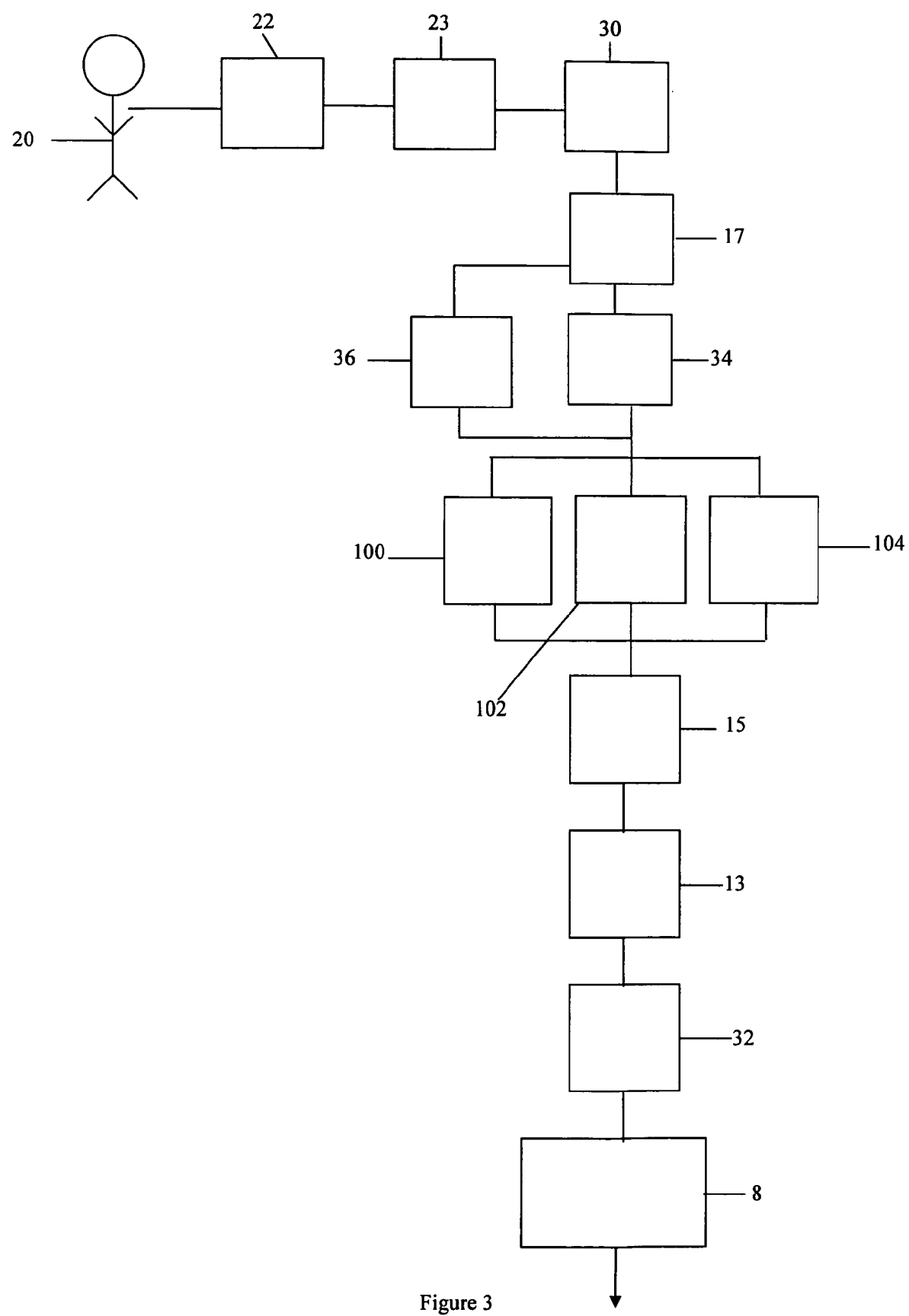
FIG. 3 is a diagram of the steps involved in the method of the invention.
Figure 3:
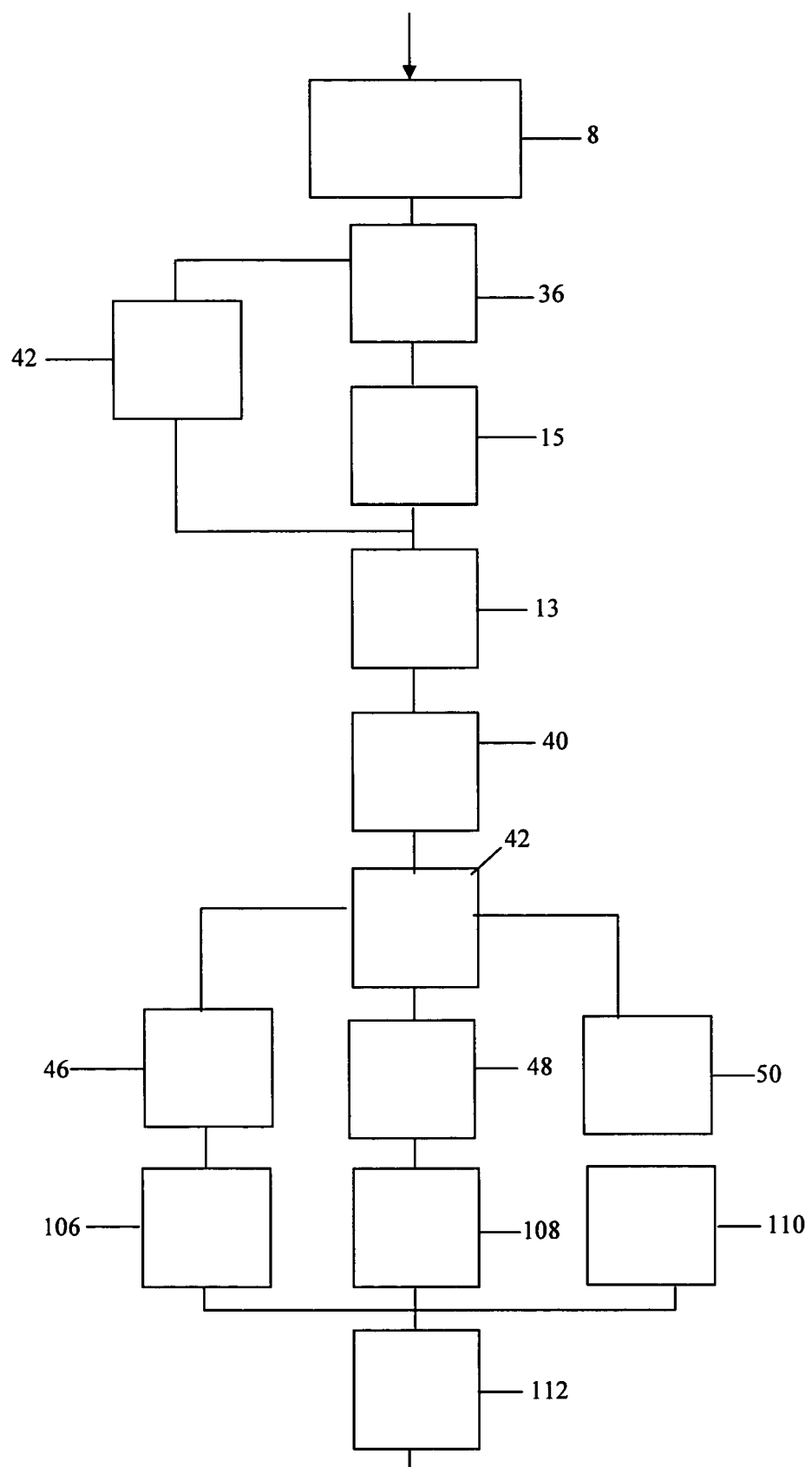
Figure 3:
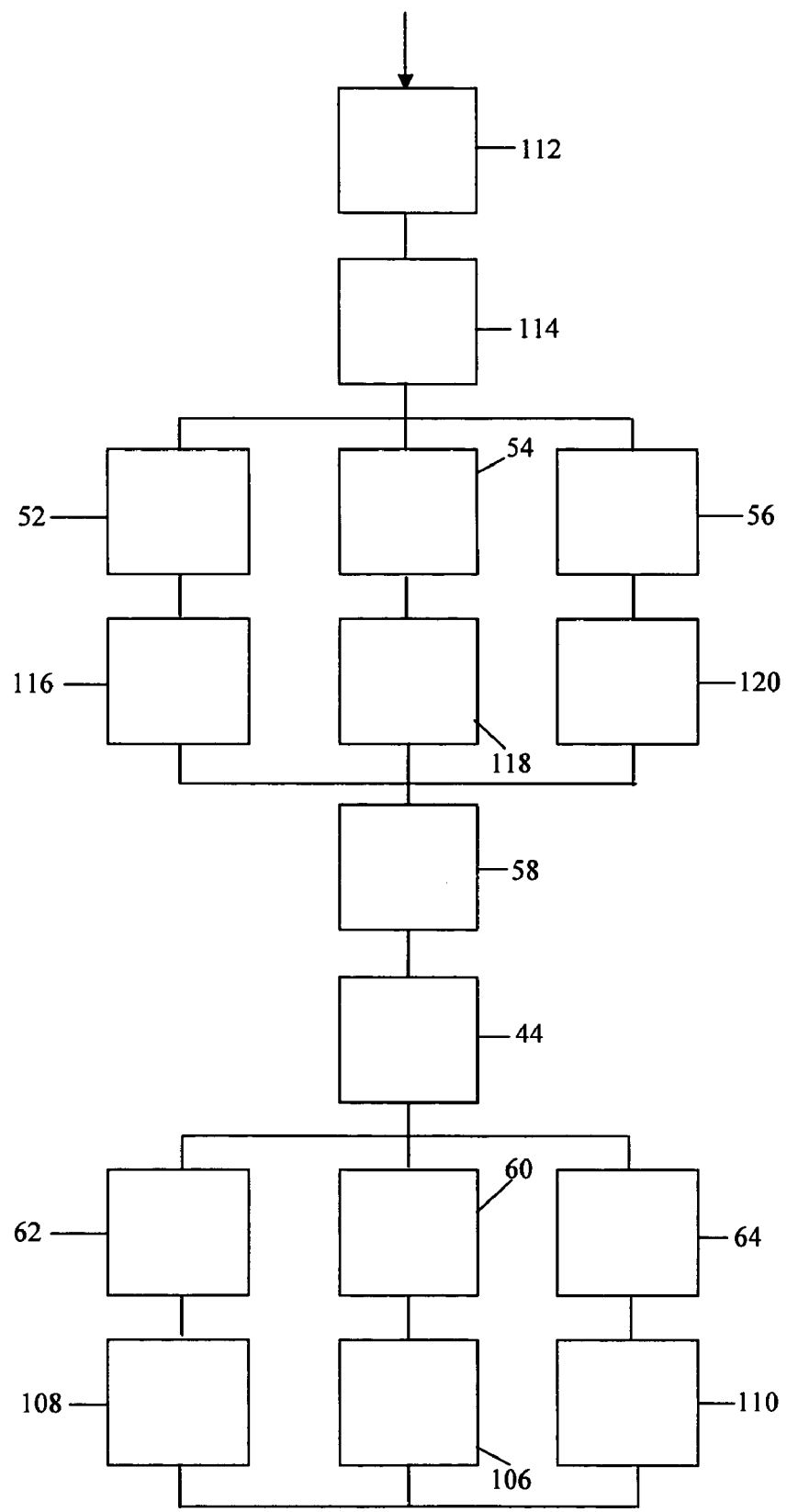

The method begins as shown in FIG. 3 by entering a user code (22) to log onto the mobile computer and training the voice recognition software to recognize the user's speech. The user (20) requests instructions (30) from the pick-by-line application software (17), which then provides information (34) from the pick-by-line applications software to the display and by using the text-to-speech software (15).

Using the pick-by-line software, the user can identify at least one source transport device (8) from which an object is to be picked. The identification is done via the voice recognition software and audio input device. The user accomplishes this by speaking the identifying characters (100) on the source transport device (8) into the audio input device, scanning a barcode (102) disposed on the source transport device, or reading a RFID data (104) disposed on the source transport device. The text-to-speech software and audio output device is then used to ask the user to verify that the identification of the source transport device is correct (106).

Next, the user transmits a request (32) from the mobile computer to the pick-by-line server (18) to obtain a list of objects to be picked and disposed from at least one source transport device. The pick-by-line applications software generates a summary of the objects (36) to be picked from the at least one source transport device (8) and displays the summary of the objects to be picked on the display (12). The summary of the objects to be picked is communicated via the text-to-speech software to the audio output device (36). The user acknowledges the summary of objects to be picked (41) by the user using the tactile input device (14) or the audio input device (31). The method can further involve a step where the user is informed if the objects on the source transport device identified are not ready to be picked.

The user, then, identifies at least one object (44) on the at least one source transport device by speaking (46) the characters (106) on the object into the audio input device, scanning (48) a barcode (108) disposed on the object, or reading (50) an RFID data (110) disposed on the object. This step is repeated until all objects on the source transport device (8) have been identified.

The pick-by-line applications software, the text-to-speech software, and audio output device are then used to instruct the user to go to a location (112) of a receiving transport device (9). The user sends an acknowledgment to the pick-by-line applications software when the user reaches the appointed location. The user does this by using the using the audio input device and voice recognition software. The acknowledgement word can be "ready".

The pick-by-line software via the text-to-speech software and audio output, then requests that the user confirm that he at the appointed location. The user confirms his location by speaking the characters disposed on the receiving transport device into the audio input device, scanning (54) the barcode (118) disposed on the receiving transport device, or reading (56) the RFID data (120) disposed on the receiving transport device.

Using the audio output device, the user is instructed to select and move (58) at least one object (44) in an amount from the source transport device to the receiving transport device. The user confirms at least one object was moved by speaking (60) the characters (106) on the object into the audio input device, scanning (62) a barcode (108) disposed on the object, or reading (64) an RFID data (110) disposed on the object.

The user then repeats the steps of identifying the correct items and the acknowledging the moving of the item until all of the items have been moved from the source transport device to the receiving transport devices.

An acknowledgement is provided to the pick-by-line systems (66). The acknowledgment includes a report of the results of all of the method steps. The results are then transferred from the pick-by-line server to the at least one external computer system. The loader system server can be a Spectrum 24 802.11b-11 Mbps Network or similar device provided by Symbol Technologies.

In an alternative embodiment, the method can further involve the step of using the mobile computer to obtain status information about the user. The information is an indication of the user's performances compared to the expected completion time for the loading method.

The method can also involve numerous answers to a series of safety questions. These safety answers and questions are required from the user regarding the transport device. These safety questions can be one or more of the of the following:
a. are the brakes working?;
b. is the horn working?;
c. is the steering working?;
d. are there any leaks in the source transport device (8)?;
e. is there any damage to the source transport device (8)?; and
f. are the tires and wheels inflated and undamaged?

Any time during the method, a second user can contact the first user from a remote location via the loader systems server. The pick-by-line server communicates with the mobile computer that, in turn, provides the communication via audio output device and display.

The following paragraphs describe an example of one use of the novel system. The Pick By Line System is designed to assist pickers in picking items from a source transport device (product pallet) onto receiving transport device (store order pallet). This function is known as "line pick". This system consists of two separate components that function as an integrated system by communicating to each other via a spread spectrum radio system. The specific components shown in FIG. 4.

a. Pick By Line Server (PBLS) (19)—The primary function of the PBLS is to handle communication to/from the External Computer System (ECS) (21) also known as the Warehouse Management System (WMS) and the Mobile Computer (MC) (10). It also maintains and displays current and historical selection data; and b. Mobile Computer (MC) (10)—This unit assists the pickers in carrying out their job functions. The MC consists of a mobile computer system, a headset that communicates instructions to the picker and receives picker input via voice responses, a wireless back-of-the-hand scanner or radio frequency identification (RFID) reader that will be used to identify the store's receiving transport device onto which the objects will be placed. The MC interfaces with the PBLS using radio frequency communications. This system is worn by the picker to assist and direct him through the picking process.

Figure 4:
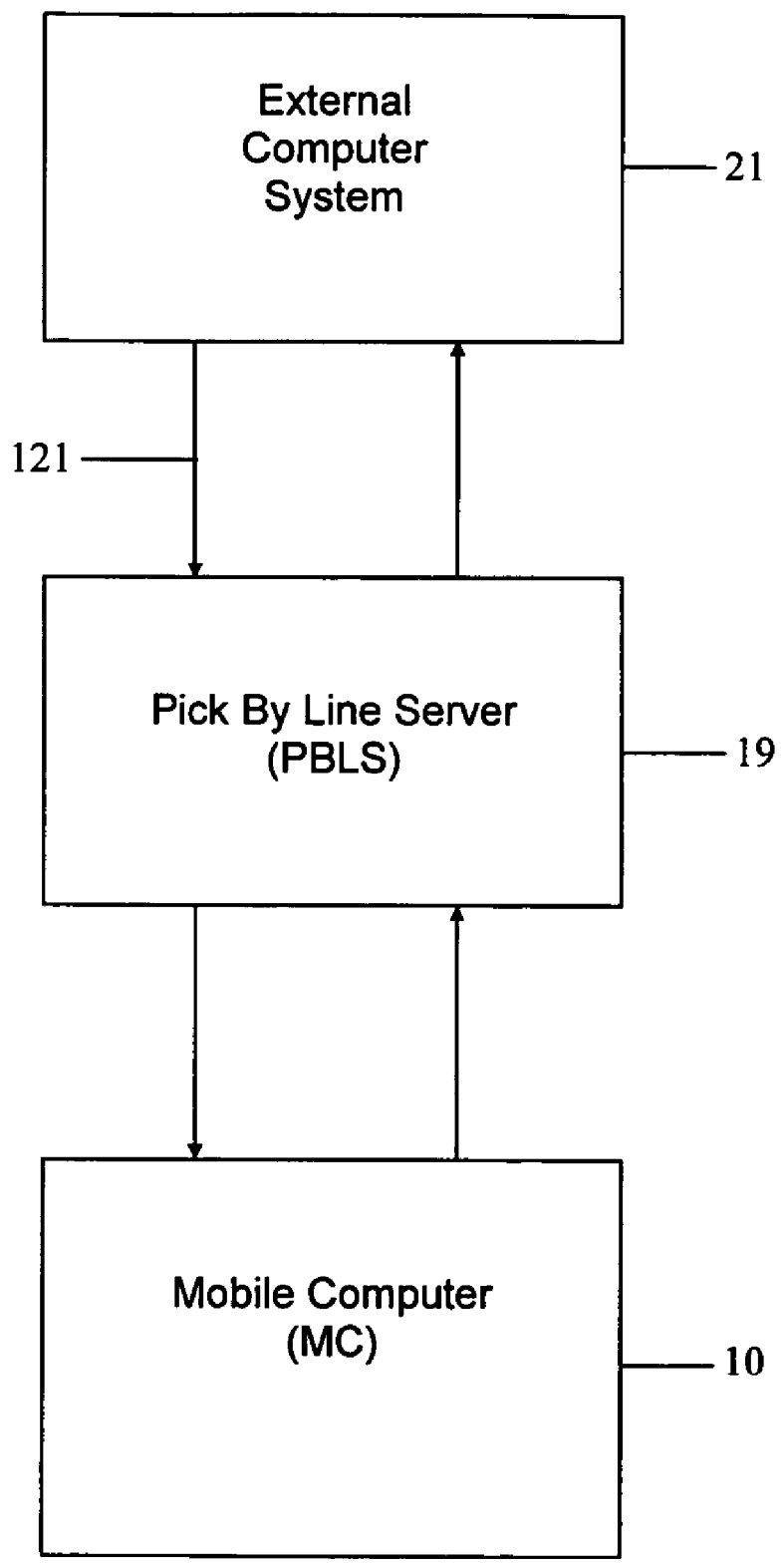
FIG. 4 is an overview of the system example.

FIG. 4 provides an overview of the data flow in the Pick By Line System. The PBLS obtains groups of assignments (121) for selection from the ECS. When requested, an assignment is communicated to the MC that sequentially directs the picker, via the headset, to pick the objects from a source transport device onto the individual receiving transport device. Using the headset and microphone, the picker chooses a source transport device and is then directed to the receiving transport device (pallets) where the items are to be placed. The MC announces the store location (zone/lane/branch number) and then waits for the picker to scan the bar-coded location ID using the laser scanner. While the MC is waiting for the picker to go to the location, the picker may say several keywords in order to have the MC speak the object description, item number, TUC number or location. The picker confirms that he has arrived at the correct location by speaking characters identifying the location by scanning the location ID bar code or the MC reading the location RFID. The picker should then place the required number of objects on the receiving transport device and say "ready" to indicate the pick has been completed. Once the pick has been completed, the MC checks to see if there are any additional objects on the source transport device that need to be placed on the current receiving transport device. If so, the picker is directed to place those objects on the receiving transport device as well. Once the objects for the receiving transport device have been handled, the MC directs the picker to the next receiving transport device location (zone/lane/branch number) and the process is repeated.

After all objects listed on the source transport device have been picked, the processing is complete. The picker may now select another source transport device for processing or log off the Pick By Line System.

The initial training contemplated for the system involves the following. When a selector logs onto the MC, the user ID is validated. Provided the user ID is valid, an additional check is made to determine whether or not the user has voice-trained the system. If so, the MC is ready for use and the MC speaks the next appropriate prompt. However, if the user has not voice trained the system, the MC announces that it is about to train the basic system vocabularies. The MC then prompts the user to speak each of the basic system phrases. This training process requires less than 3 minutes.

The MC then announces that it is beginning training and that the selector should say each word as it is displayed on the screen. The MC displays a group of basic system phrases (or words) one phrase at a time and waits for the selector to say that phrase.

Once the selector has spoken the phrase displayed on the screen, the MC displays the next phrase. This process continues until each of the basic system phrases has been displayed. When the last phrase has been spoken, the MC announces, "the training is done" and the MC proceeds to the next appropriate prompt.

While training the basic system phrases trains many of the words used by the MC, it is not contemplated to train all the phrases. The basic system phrases are those phrases that are common to many of the MC prompts. Other phrases exist that are only used at one or two prompts. For example, the phrase "pick short" may only be spoken at the Pick Quantity prompt. If the system is having difficulty understanding a certain phrase, the user may say "display menu" and train that particular word that is not being understood.

Figure 5:
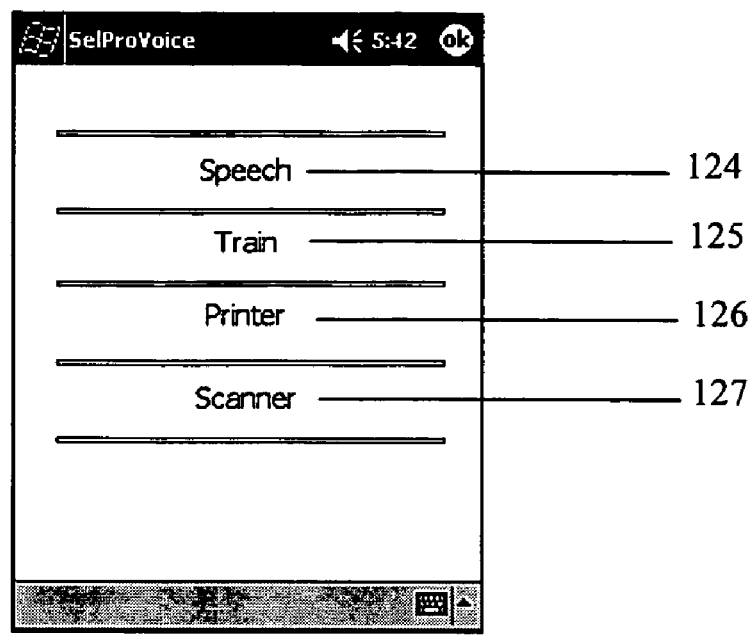
FIG. 5 is a display of the MC configuration menu.

The system is contemplated to have a configuration menu that will allow the selector to modify certain MC settings that were either automatically defaulted by the system or set up during initial system startup. The MC settings that may be modified include the sound of the MC voice, any previously trained word or phrase, the portable printer ID (if any) and the laser scanner ID (if any). In order to modify one of these MC settings, the selector should say, "display menu" while at most MC prompts. When the MC recognizes the "display menu" command, the MC displays the system configuration menu shown in FIG. 5 and prompts the selector to speak the desired menu function.

The selector may say one of the following four words to select the corresponding function:
a. "Speech" (124)—Allows the selector to modify the volume, speed and pitch of the MC voice;
b. "Train" (125)—Allows the selector to retrain a particular word or phrase;
c. "Printer" (126)—Allows the selector to change label printers. If the MC does not support a portable label printer, the MC announces, "There are no printers configured" and exits the system configuration menu; and
d. "Scanner" (127)—Allows the selector to change laser scanners. If the MC does not support a laser scanner, the MC announces, "There are no scanners configured" and exits the system configuration menu.

Note, if the selector decides he does not want to perform any of the menu functions at this time, he may also say, "cancel" (or press the clear key) to exit the system configuration menu. When this is done, the MC repeats the prompt that was spoken before the selector said, "display menu".

Figure 6:
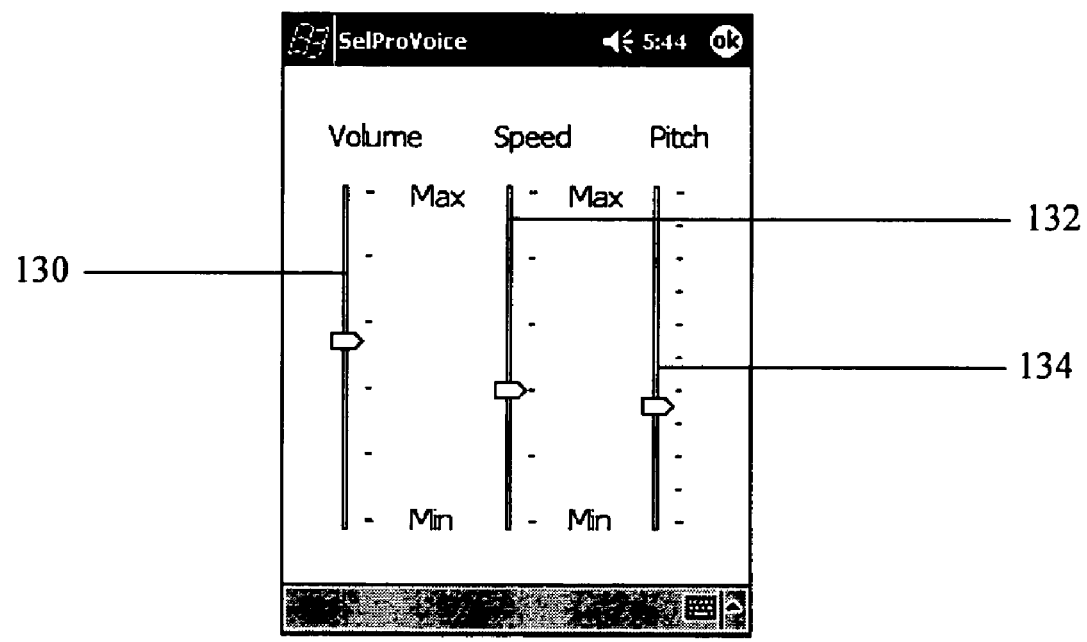
FIG. 6 is the speech configuration menu.

When the MC is first started, the volume, speed and pitch of the MC voice are either set to the default values or to the last values selected by the selector. The system configuration menu allows the selector to modify these parameters that control the MC voice. While the system configuration menu is displayed, the selector may say "speech" in order to configure the MC voice. When the selector says "speech", FIG. 6 is displayed.

The selector may adjust the volume, speed and pitch by either taping the appropriate control on the screen or by speaking the appropriate control command. After a control is tapped or a control word is spoken, the MC makes the corresponding adjustment and then asks, "How is this?" using the adjusted MC voice. The selector may continue to tap the controls or speak the control words until the MC voice is the way he wants it. The selector should then say, "done" to indicate he has completed the MC voice adjustments. The selector may also say, "cancel" to discard any adjustments made to the MC voice. Once the selector has said "done" or "cancel", the MC returns to the prompt that was spoken before the selector said "display menu".

The following control words may be spoken in order to adjust the MC voice parameters:
a. Volume (130)—Use the words "louder" and "softer" in order to increase or decrease the MC voice volume;
b. Speed (132)—Use the words "faster" and "slower" in order to increase or decrease the speed of the MC voice; and
c. Pitch (134)—Use the words "increase" and "decrease" in order to increase or decrease the MC voice pitch, see FIG. 6.

These switches can also be increased or decreased using the touch screen.

Each selector can train the MC to understand his voice and speech patterns. These speech patterns represent the various words, phrases, numbers and alphabetic characters that the selector may have to say during the operation of the Selector Pro task. When the selector logs on for the very first time, the selector is prompted to voice-train the system. Once the selector has trained the system, it is not necessary to do so again. These speech patterns are recorded and saved on the host computer. When the MC changes selectors, the speech patterns for the new selector are loaded onto the MC. The MC can then recognize the commands and responses spoken by that new selector.

Figure 7:
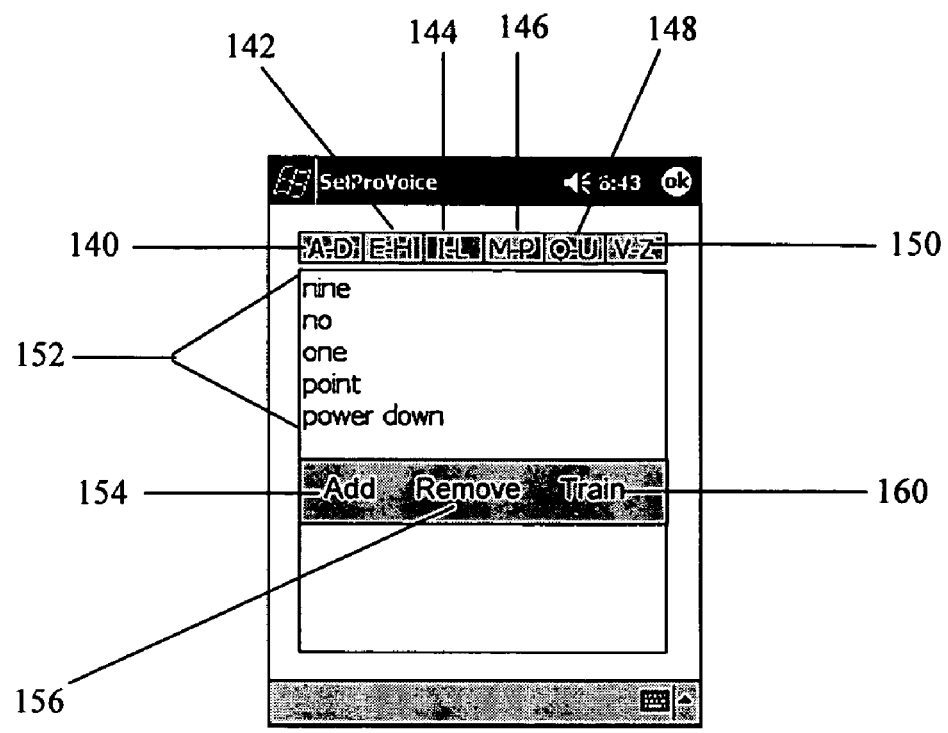
FIG. 7 is the retraining display.

If the MC ever has trouble recognizing any word(s) spoken by the selector, that word or words can be "retrained". When a word is retrained, the selector is prompted to say that word again. Once the MC has obtained a new voice sample, the speech pattern for that word or phrase is saved and reused the next time the speech patterns for that selector must be loaded onto the MC. Hopefully, by retraining the word or phrase, it will improve the ability of the MC to recognize the word the next time it is spoken. While the system configuration menu is displayed, the selector may say "train" in order to retrain one or more words then another configuration screen is displayed, see FIG. 7. FIG. 7 has touch points (buttons) (140, 142, 144, 146, 148 and 150) that allow the user to select groups of words based on the words for that heading. The selector should tap the heading in which the word to be trained would be found. When a heading is tapped (140, 142, 144, 146, 148 and 150), the list of words (152) that may be selected for training is displayed. The selector should tap on the word to be trained and then tap the 'add' (154) button. If there is more than one word the selector would like to train, the selector should tap that word and then tap the add button again. The selector may tap any group heading and add words to be trained in any order. The user can remove a word from the list by tapping on the remove (156) button. Once the selector has built the list of words he would like to train, he should tap the 'train' button. When the train button is tapped, the MC announces that it is beginning training and that the selector should say each word as it is displayed on the screen. The MC displays each of the selected words one word at a time and waits for the selector to say that word.

The retraining screen allows the selector to select the word(s) to be retrained. Since there can be a large number of words from which to choose, the MC divides the words into small groups alphabetically. The headings at the top of the screen (e.g. A–D, E–H, etc.) indicate the group of words for that heading. The selector should tap the heading in which the word to be trained would be found. When a heading is tapped, the list of words that may be selected for training is displayed. The selector should tap on the word to be trained and then tap the add button. If there is more than one word the selector would like to train, the selector should tap that word and then tap the add button again. The selector may tap any group heading and add words to be trained in any order. Once the selector has built the list of words he would like to train, he should tap the train button. When the train button is tapped, the MC announces that it is beginning training and that the selector should say each word as it is displayed on the screen. The MC displays each of the selected words one word at a time and waits for the selector to say that word.

Figure 8:
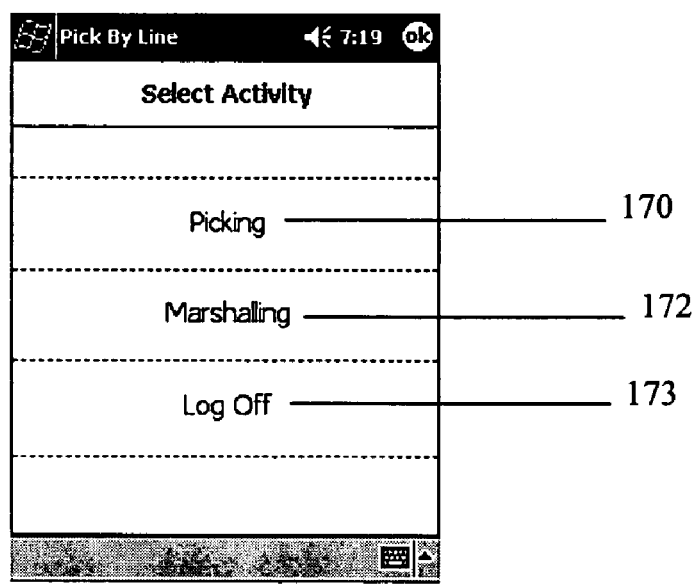
FIG. 8 is the select activity display.

The select activity display shown in FIG. 8 is the point from which all other MC activities are started. Once a user has logged on and responded to the initial set of prompts, the MC is ready to perform the day-to-day activities. The user may request an assignment to process, perform marshalling functions or log off the system entirely. Whenever picking is completed or the marshalling functions are finished, the select activity prompt is spoken (and redisplayed) so that the picker may choose his next activity.

The picker may say "picking" (170), "marshalling" (172) or "log off" (174). The picker may also press any of the selections on the MC screen. If the picker wants to pick assignments, he should say "picking" (170). When the picker indicates he wants to perform picking functions, the MC prompts the picker to enter a pallet number to process.

If the picker wants to perform any of the marshalling functions, the picker should say "marshalling" (172). The picker is then presented with a menu of the marshalling functions that may be performed.

The picker may also log off (174) for the day. As previously stated, the select activity prompt is spoken after the picker has completed a picking or marshalling activity. That activity could be the last activity for the picker for the day. For this reason, the select activity prompt's third choice is to log off the MC.

Figure 9:
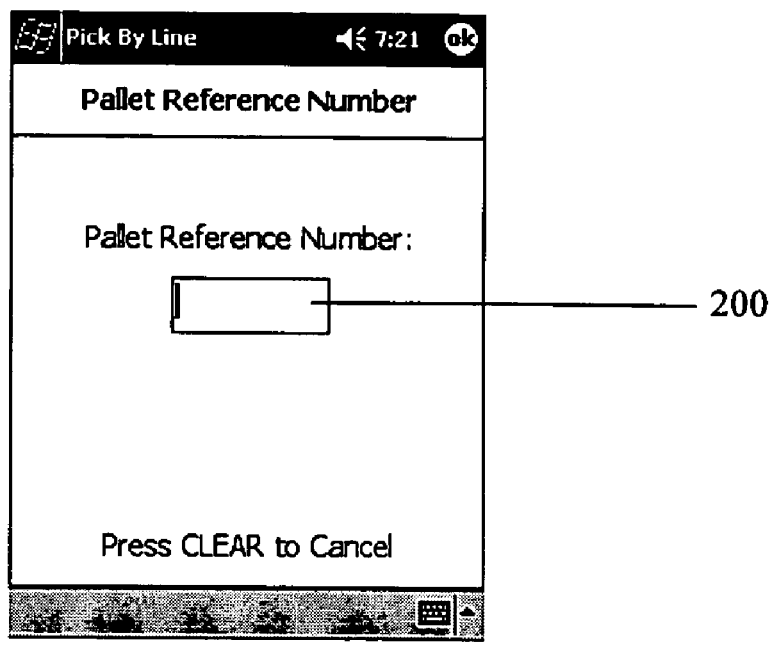
FIG. 9 is the screen displayed by the MC when it requests the entry of the source transport device (pallet) number.

When the picker indicates he wants to pick assignments, he is first prompted to enter the source transport device (pallet) reference number (200), as shown in FIG. 9. The source transport device reference number is used to uniquely identify each source transport device to be picked. Using the source transport device reference number, the PBLS can identify the source transport device and all the objects on the source transport device. Likewise, the source transport device information is downloaded to the MC for verification and picking. When the picker indicates he wants to pick assignments or he has just completed an assignment, the MC prompts the picker for the next source transport device to process., "Enter the pallet reference number. Is {pallet reference number} correct?", as shown in FIG. 9.

The source transport device (pallet) reference number is usually printed on an orange label and affixed to the source transport device. The picker may either enter the reference number by scanning the bar code label, speaking the number, keying the number on the MC keyboard or by the MC reading the source transport device RFID. If the source transport device reference number is spoken, the MC repeats the number so that the picker may confirm that the number was entered correctly. The picker should indicate whether or not the number is correct by saying "yes" or "no". If the picker says "no", the MC re-prompts for the pallet reference number. Note, the "Is {pallet reference number} correct?" prompt is bypassed if the source transport number reference number is entered using the laser scanner or the MC keyboard. In any case, if the picker says "yes" indicating the number is correct or the number was entered using the scanner or keyboard, the MC sends the number to the PBLS for validation.

Once the source transport device reference number (200) has been entered and validated, the corresponding assignment is downloaded from the PBLS to the MC. As the MC is receiving the assignment from the PBLS, the MC announces the assignment that is being received. See FIG. 10, the MC says, "assignment {Assignment No.} for pallet {pallet number} has {number of objects} (products) and {number of cases} total objects. To continue, say ready." This prompt provides the picker with a summary of the assignment. The assignment number, source transport device number and number of distinct objects are announced along with the total number of objects on the pallet. This allows the picker to confirm that the assignment matches the source transport device contents while the assignment download completes.

Figure 10:
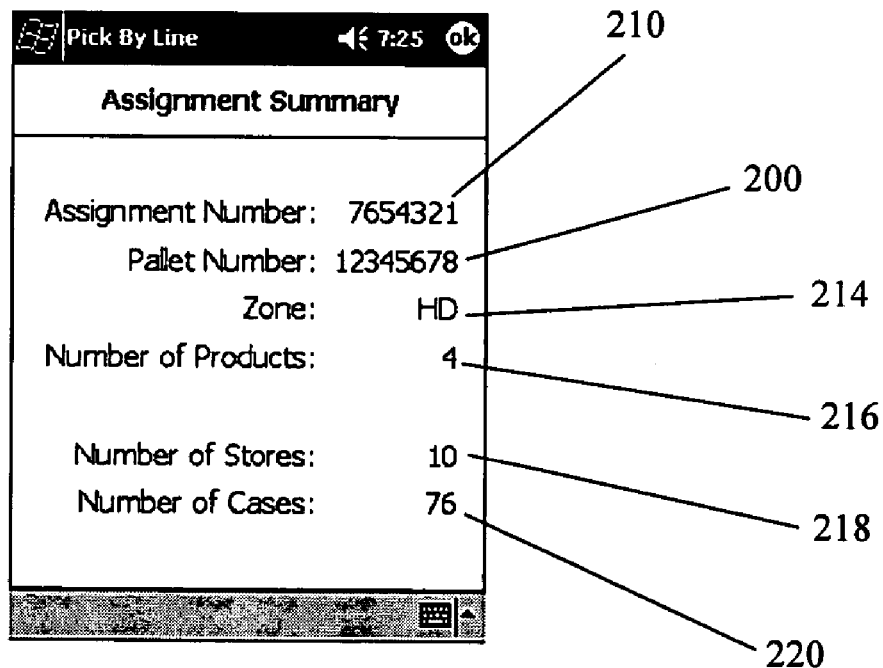
FIG. 10 is a display of the assignment summary that details the objects to be placed.

FIG. 10 is a display of the assignment summary. Specifically, the display shows the assignment number (210); source transport device (pallet) number (200); warehouse zone number (214); and the number of types of products (216) to be picked. The number of types of products (216) to be picked includes number of types of receiving transport device locations (stores) (218) to which objects are to be picked and the total number of objects (cases) (220) that are to be picked.

After a pallet reference number is entered and the corresponding assignment is downloaded, the picker must verify that the products on the pallet match the products in the assignment. This is done by having the picker enter the TUC (trader's unit code) (224) of the different products on the pallet. Since the MC has the assignment information, the MC prompts the picker to enter the TUC of the product in position 'A' (224). When the TUC is entered, the MC verifies that the TUC belongs to the assignment. If there are additional products in the assignment, the MC prompts the picker to enter the TUC of the product in position 'B'. This procedure continues until the MC has confirmed that the pallet contains all the required products. At that point, the MC informs the picker the validation is complete and he may begin picking the assignment.

Figure 11:
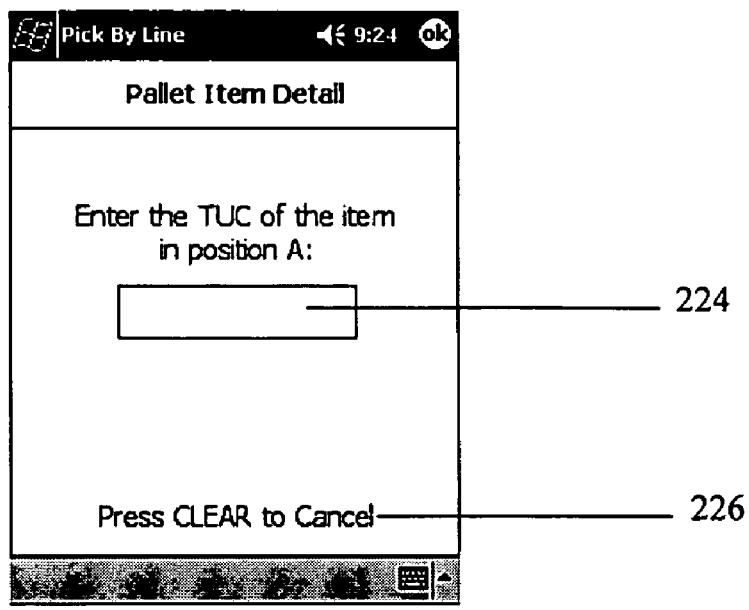
FIG. 11 is the screen displayed by the MC when it requests the entry of the trader's unit code (TUC)

Once the assignment has been downloaded to the MC, the picker is instructed to enter the TUC of the objects (224) on the source transport device, as shown in FIG. 11. The MC prompts for the objects one object at a time. When a TUC is entered, the MC verifies that the TUC is part of the assignment. If there is more than one object on the source transport device, the picker may not scan the same object more than once. Each time the picker is prompted to enter a TUC, the following prompt is made, "enter the TUC in position {alphabetic pallet position}."

The first position on the pallet is 'A'. If there is more than one object type on the source transport device, the second position is 'B' and so on. The picker must scan, speak or key the 14-digit TUC. When the TUC is entered, the MC verifies that the TUC belongs to the assignment. Note, once an object type has been identified as being in a source transport device position (e.g. 'A', 'B', 'C', etc.) it may not be entered for any other position. Thus, when a TUC is entered, the MC verifies that the TUC belongs to one of the objects in the assignment and that the object has not already been identified in a previous position. That is, the picker may not enter the same TUC for two different positions. If the TUC does not pass the validation checks, the MC informs the picker that the TUC scanned is invalid.

During the verification phase the picker may determine that he has the wrong pallet, wrong assignment or there is something wrong about the product(s) on the pallet. In this situation, it may be best if the picker cancels the verification phase and rejects the assignment. For this reason, the picker may say "cancel" (226) in order to terminate the processing of the assignment.

During the source transport device (pallet) verification process, it is possible for the picker to be unable to enter a TUC. It could be that the object has a new TUC that does not match the information in the assignment. It could be that the object TUC is not readable or not available. Or, it could be that the incorrect object is on the source transport device. In any case, the picker may say "override" at the Enter the TUC prompt in order to display a list of the objects in the assignment. Using the list displayed on the screen, the picker may manually select the object. When the picker says "override", the screen of FIG. 12 is displayed.

Figure 12:
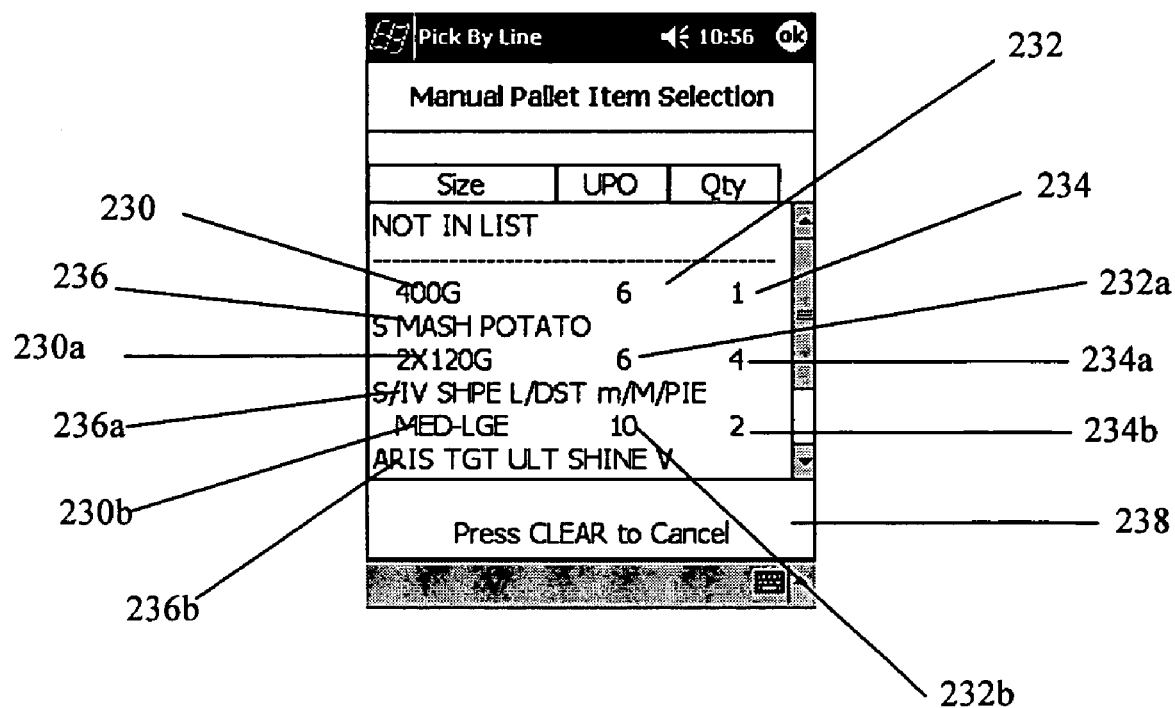
FIG. 12 is a display that is used for manual selection of an object for the source transport device verification process.

FIG. 12 lists each of the objects in the assignment that have not already been identified. That is, if an assignment had 4 object types and the picker has already identified the object in one position on the pallet, the screen would display the remaining 3 object types from which the picker may choose. Two lines are used to provide the information for each object. The first line contains the object size (230, 230*a* and 230*b*), units per outer (UPO) (a case or a pack) (232, 232*a* and 232*b*) and the quantity of items on the source transport device (234, 234*a* and 234*b*). The second line contains the object description (236, 236*a* and 236*b*). The picker should use the stylus to tap on the desired object. When an object is selected, the picker is prompted to scan the bar code (any bar code) that will be used to identify this object for the duration of the assignment. There is also a cancel (238) option to allow the user to exit the display without making a manual selection of an object to be picked.

Figure 13:
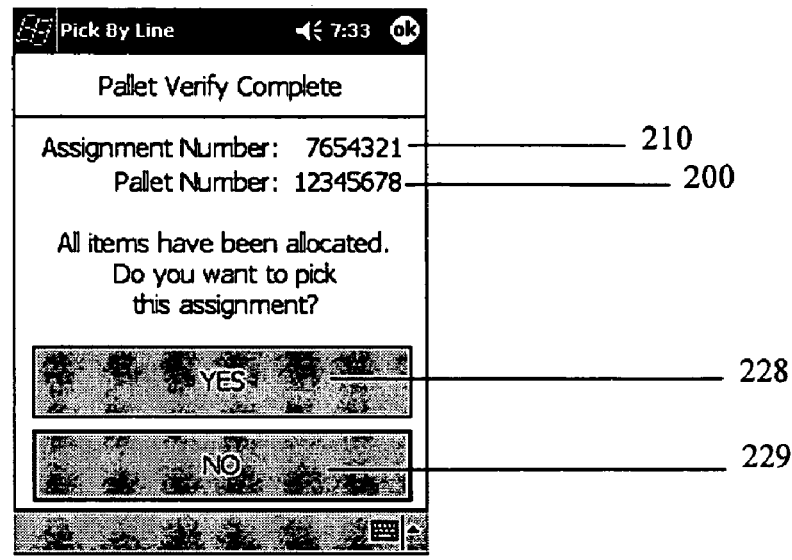
FIG. 13 is the screen displayed by the MC when it requests the user to confirm that the verification of all of the objects on the transport device has been completed.

Once the picker has identified the pallet position of each product in the assignment, the MC informs the picker that the verification process is complete. The MC also asks if the picker wants to pick this assignment, see FIG. 13.

If the picker notices that there are additional products on the pallet that weren't identified, it indicates that there is a discrepancy between the assignment and the products on the pallet. This announcement gives the picker one last chance to cancel the picking of this assignment. The picker should indicate whether or not he wants to cancel the assignment by saying "yes" or "no". If the picker says "yes" (228), the MC continues to the assignment picking process. If the picker says "no" (229), the MC terminates the assignment, informs the PBLS that the assignment was terminated (and never started) and then returns to the pallet reference number prompt so that the picker may select another pallet.

Figure 14:
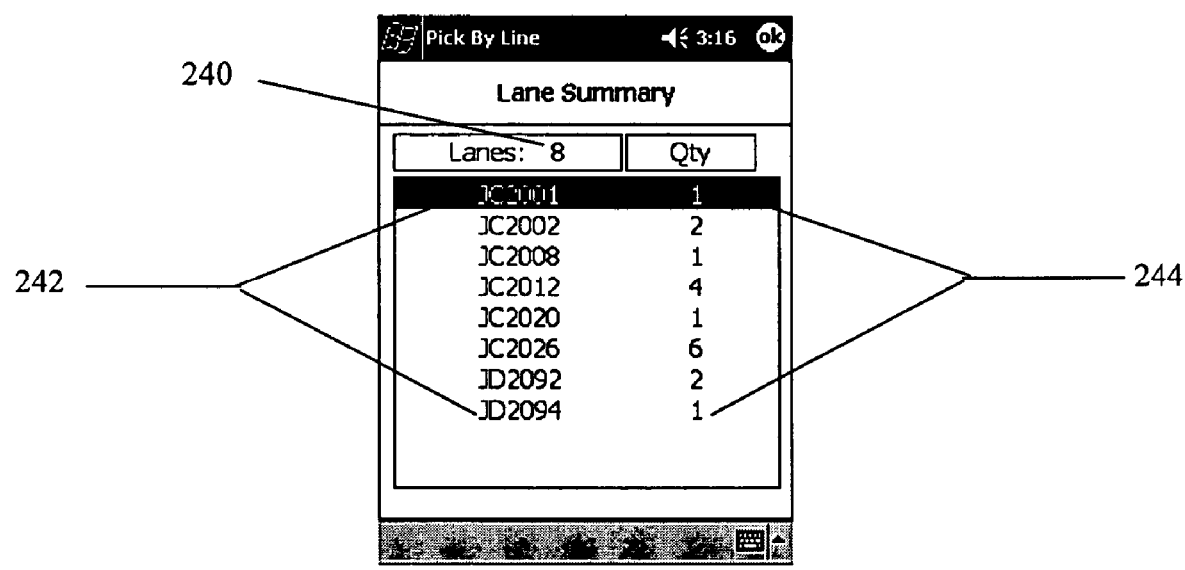
FIG. 14 is a display of the lane summary that details the location of the receiving transport devices.

After the source transport device has been verified, the assignment is ready to be picked as shown in FIG. 14. The MC screen displays a list of the lanes to be picked. The MC then instructs the picker to go to the first location (lane) in the list. As each location is picked, the lane is removed from the list. Using the screen shown in FIG. 14, the picker may review the number of lanes to pick and their pick quantities. Note, it is preferred that the picker not go to any lane shown on the list but must instead go to each lane sequentially (i.e. in the order displayed on the screen). The MC instructs the picker as to which lane to go to, "go to lane {lane number}." When the picker arrives at the lane (but not before), the picker should say "ready". When the picker says "ready", the MC prompt the picker to confirm he has arrived at the correct lane by entering the lane ID an exemplary lane summary is shown in FIG. 14. The lane summary display shows a list of the remaining receiving transport device locations (lanes) for which objects are to be picked. Specifically, the display shows the number of remaining receiving transport devices locations (lanes) (240); a list of the specific receiving transport devices locations (lanes) (242); and the quantity of objects to be picked for each receiving transport device (244).

If for some reason the picker needs to terminate the processing of this assignment before all the objects in the assignment have been picked, the picker may say "cancel" at the go to lane prompt (above). When the picker says "cancel", the MC asks him to confirm that he wants to cancel the processing of the assignment.

Figure 15:
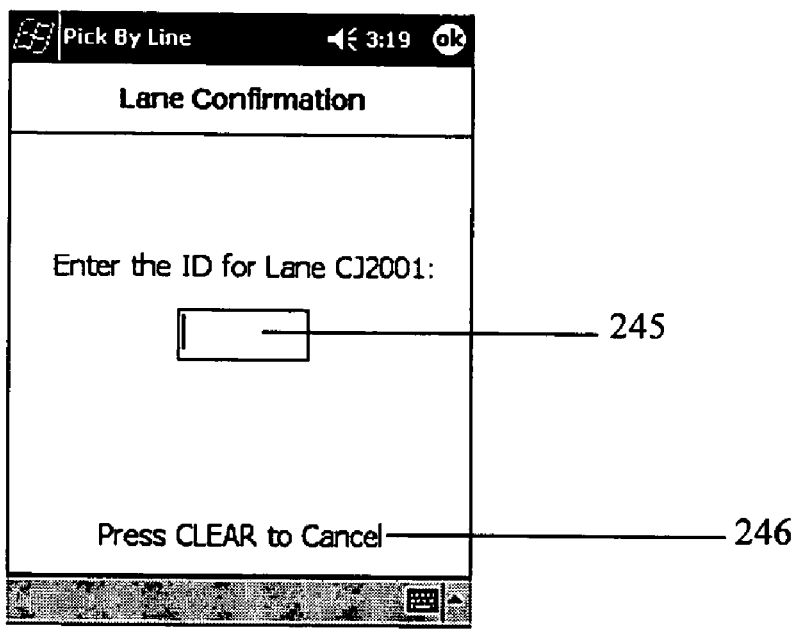
FIG. 15 is the lane confirmation display.

The MC then prompts the picker to confirm he is at the correct lane, as shown in FIG. 15, by scanning the bar code on the lane identification sign. The MC says, "scan lane". At this point, the picker should scan the lane identification bar code (244). If the bar code is unreadable, the picker may also speak the last 3 digits of the lane number and say "ready". If the picker scans or speaks the incorrect bar code ID, the MC informs the picker that the bar code is invalid and then re-prompts the picker to "scan lane" again.

While the MC is waiting for the picker to confirm he is at the correct lane, the picker may also say "cancel" (246) and return to the "go to lane" prompt.

Figure 16:
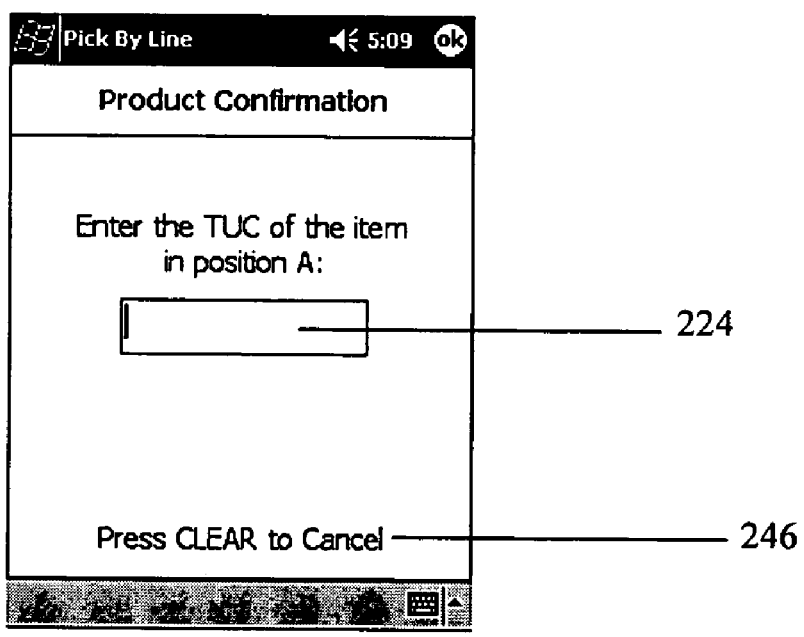
FIG. 16 is the object (product) confirmation.

Before the picker may pick the objects from the source transport device and place them on the receiving transport device, the picker must confirm that the objects are correct. This is done by having the picker enter the TUC of the object he is about to pick as shown in FIG. 16.

The picker must scan, speak or key the 14-digit TUC or the manually entered ID in order to identify the product. When the TUC is entered, the MC verifies that the TUC belongs to the product that is should be picked. If the TUC is not for the required product, the MC informs the picker that the TUC scanned is invalid.

This step is only necessary if there is more than one object type on the source transport device. If there is only one object on the source transport device, this step is bypassed and the MC instructs the picker as to how many objects to pick.

When there is more than one object on the source transport device, the MC tells the picker from which position on the source transport device he must pick the objects. In order to confirm the objects the picker is about to pick are correct, the picker must enter the TUC from one of the objects. If the TUC is incorrect, an error message is issued and the picker is prompted to reenter the TUC. If the TUC is correct, the picker is prompted to pick the required quantity. The picker must scan, speak or key the 14-digit TUC or the manually entered ID in order to identify the object. When the TUC is entered, the MC verifies that the TUC belongs to the object that is should be picked. If the TUC is not for the required object, the MC informs the picker that the TUC scanned is invalid.

Figure 17:
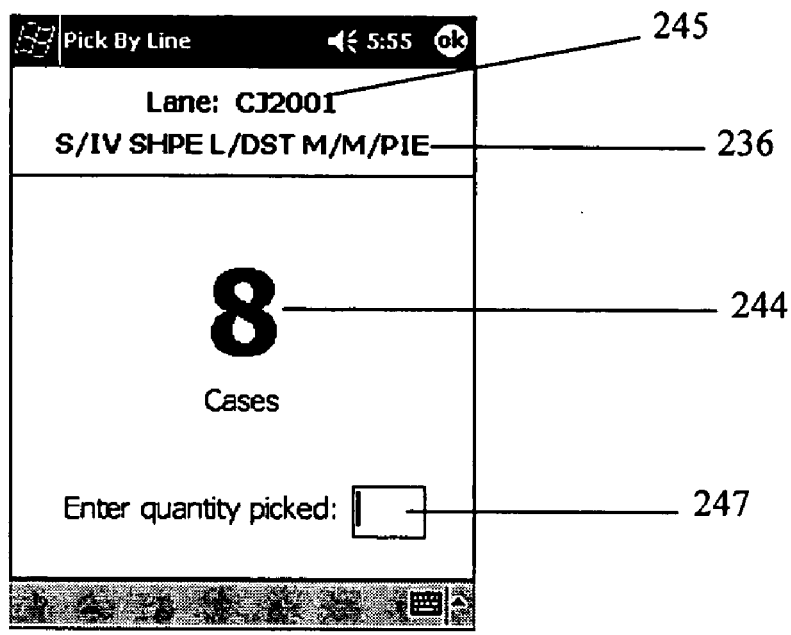
FIG. 17 is the screen displayed when the MC prompts the user to pick the objects.
Figure 18:
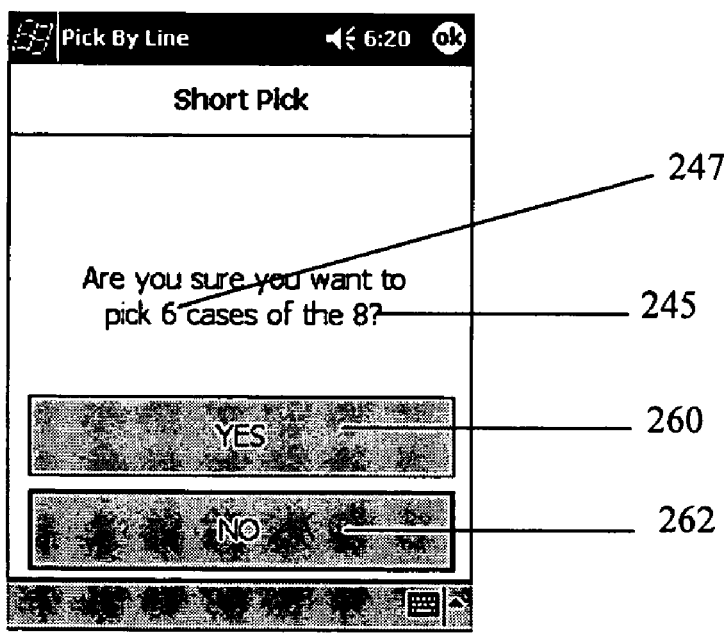
FIG. 18 is the screen displayed when the MC requests the user to confirm that the objects were picked short.

Once the picker has confirmed he is at the correct lane and has the correct product, the MC announces the quantity to pick (244) and displays FIG. 17. This same information along with the lane number (245) and product description (236) is displayed on the MC screen. The prompt is "pick {number of objects to pick} objects from position {alphabetic position}." If there is just one object type on the source transfer device, the "from position . . . " phrase is omitted. The picker should pick the indicated quantity and then say the quantity picked (247) followed by the word "ready". For example, if the picker picked 2 objects, he would say "two ready". If the picker picked 10 objects, the picker would say "one zero ready". If the quantity entered exceeds the quantity required, an error message is spoken and the picker is prompted to reenter the quantity picked. When the picker indicates that he has picked the required quantity, the MC will instruct the picker to go to the next line or if all of the picks for the assignment have been completed to get a new assignment.

If the quantity entered is less than the quantity required, it indicates that the pick is short. When an item is picked short, the picker must confirm that he actually had to short the pick.

The picker should indicate whether or not he wants to pick short by saying "yes" (260) or "no" (262). If the picker says "no", the MC returns to the pick quantity prompt where the picker is again prompted to enter the quantity picked. If the picker says "yes", the MC reports the shorted quantity picked to the PBLS and then must determine what to do next.

While the MC is waiting for the picker to indicate the pick has been completed, there are a number of keywords the picker may speak in order to obtain additional information regarding the pick. This information includes the current location (lane number), the product description and the TUC number.

After the picker has confirmed he has arrived at the correct lane while at the pick quantity prompt, the MC waits for the picker to pick the required number of objects and then speak the quantity entered. While the MC is waiting for a response to the pick quantity prompt, there are a number of keywords the picker may speak in order to obtain additional information regarding the pick. The following keywords may be spoken in addition to the normal response.

a. Location"—When this keyword is spoken, the MC speaks the current lane number (that should be picked): "Current lane is xxxxxx";

b. "Description"—When this keyword is spoken, the MC speaks the description of the object to be picked. This is the same description that is displayed at the top of the pick quantity screen; and c. "TUC"—When this keyword is spoken, the MC speaks the TUC number of the object to be picked from the source transport device.

Once the object detail information has been spoken, the MC automatically repeats the previous prompt and waits for the picker to speak the required response or speak another object detail keyword. Note, with the exception of the TUC number, this information is always displayed on the MC screen while the MC is waiting for the picker to pick the lane.

While this invention has been described with emphasis on the preferred embodiments, it should be understood that within the scope of the appended claims the invention might be practiced other than as specifically described herein.

What is claimed is:

1. A method for picking an object from a source transport device comprising:
   a. using a mobile computer having a barcode reader, a display, an audio output device, an audio input device, a tactile input device, text-to-speech software, a voice recognition software, pick-by-line applications software, a printer and radio frequency identification (RFID) reader wherein the mobile computer is adapted for communication between a pick-by-line server and a user and the pick-by-line server is adapted for communication between the mobile computer and at least one external computer system;
   b. entering a user code to log onto the mobile computer;
   c. training the voice recognition software by the user;
   d. providing instructions to the user from the pick-by-line applications software using the text-to-speech software to the audio output device and providing information from the pick-by-line applications software to the display;
   e. using the pick-by-line software to request via the text-to-speech software and audio output device that the user identify at least one source transport device from which an object is to be picked by a step selected from the group comprising of:
      i. speaking an identifying characters on the source transport device into the audio input device;
      ii. scanning a barcode disposed on the source transport device; and
      iii. reading a RFID data disposed on the source transport device;
   f. using the text-to-speech software and audio output device to ask the user to verify that the identification of the source transport device is correct;
   g. transmitting a request from the mobile computer to the pick-by-line server to obtain a at least one source transport device of objects to be picked and disposed on the at least one source transport device;
   h. using the pick-by-line applications software to generate a summary of the objects to be picked from the at least one source transport device;
   i. displaying the summary of the objects to be picked on the display;
   j. providing the summary of the objects to be picked using the text-to-speech software and the audio output device;
   k. performing a step which is a member of the group: acknowledging the summary of objects to be picked by the user using the tactile input device and acknowledging the summary of the objects to be picked using the audio input device;
   l. identifying at least one object on the at least one source transport device by a step selected from the group consisting of:
      i. speaking the characters on the object into the audio input device;
      ii. scanning a barcode disposed on the object; and
      iii. reading an RFID data disposed on the object;
   m. repeating step 1 (above) until all objects on the source transport device have been identified;
   n. using the pick-by-line applications software and the text-to-speech software and audio output device to instruct the user to go to a location of a receiving transport device;
   o. using the audio input device and voice recognition software to acknowledge to the pick-by-line applications software that the user is at the location;
   p. using the pick-by-line software via the text-to-speech software and audio output to request the user to confirm that the user is at the location by performing a step selected from the group comprising:
      i. speaking the characters disposed on the receiving transport device into the audio input device;
      ii. scanning the barcode disposed on the receiving transport device; and
      iii. reading the RFID data disposed on the receiving transport device;
   q. using the audio output device to instruct the user to select and move at least one object in an amount from the source transport device to the receiving transport device
   r. the user confirms at least one object was moved by the step selected from the group:
      i. speaking the characters on the object into the audio input device;
      ii. scanning a barcode disposed on the object; and
      iii. reading an RFID data disposed on the object;
   s. repeating steps n through r until all objects have been moved from the source transport device to the receiving transport devices;
   t. providing an acknowledgement to the pick-by-line systems the results of steps (b) through (s); and
   u. transferring the results from the pick-by-line server to the at least one external computer system.

2. The method of claim 1, wherein the acknowledgement word is "ready".

3. The method of claim 1, further comprising the step of using the mobile computer to obtain status information for the user that is an indication of the user's performances compared to the expected completion time for steps (b) through (s).

4. The method of claim 1, wherein answers to a series of safety questions are required from the user regarding the transport equipment which can be selected from the grouping comprising:
   a. are the brakes working?;
   b. is the horn working?;
   c. is the steering working?;
   d. are there any leaks in the transport equipment?;
   e. is there any damage to the transport equipment?;
   f. are the tire and wheels inflated and undamaged?; and
   g. combinations thereof.

5. The method of claim 1, wherein at any time during the method, a second user can contact the user from a remote location via the pick-by-line server, which communicates with the mobile computer then provides the communication via audio output device and display.

6. The method of claim 1, wherein the object is a product.

7. The method of claim 1, wherein the object is a piece of equipment.

8. The method of claim 1, wherein the user is informed that the source transport device identification is invalid.

9. The method of claim 1, wherein the user is informed that the objects on the source transport device identified are not ready to be picked.

* * * * *